US008243820B2

(12) United States Patent
Holcomb et al.

(10) Patent No.: US 8,243,820 B2
(45) Date of Patent: *Aug. 14, 2012

(54) DECODING VARIABLE CODED RESOLUTION VIDEO WITH NATIVE RANGE/RESOLUTION POST-PROCESSING OPERATION

(75) Inventors: Thomas W. Holcomb, Bothell, WA (US); Chih-Lung Lin, Redmond, WA (US); Pohsiang Hsu, Redmond, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 11/118,686

(22) Filed: Apr. 29, 2005

(65) Prior Publication Data

US 2006/0072673 A1 Apr. 6, 2006

Related U.S. Application Data

(63) Continuation-in-part of application No. 10/960,356, filed on Oct. 6, 2004.

(51) Int. Cl.
*H04N 7/12* (2006.01)
(52) U.S. Cl. .................................. 375/240.25
(58) Field of Classification Search ............. 375/240.25
See application file for complete search history.

(56) References Cited

U.S. PATENT DOCUMENTS

| 5,300,949 | A | 4/1994 | Rodriquez et al. |
| 5,414,469 | A | 5/1995 | Gonzales et al. |
| 5,611,038 | A | 3/1997 | Shaw et al. |
| 5,764,296 | A | 6/1998 | Shin |
| RE35,910 | E | 9/1998 | Nagata et al. |
| 5,821,986 | A * | 10/1998 | Yuan et al. .................. 348/14.12 |
| 5,828,421 | A | 10/1998 | Boyce et al. |
| 5,864,637 | A | 1/1999 | Liu et al. |
| 5,970,173 | A | 10/1999 | Lee et al. |
| 6,002,801 | A | 12/1999 | Strongin et al. |
| 6,014,694 | A | 1/2000 | Aharoni et al. |
| 6,104,434 | A | 8/2000 | Nakagawa et al. |
| 6,157,396 | A | 12/2000 | Margulis et al. |
| 6,239,847 | B1 | 5/2001 | Deierling |

(Continued)

FOREIGN PATENT DOCUMENTS

EP 1 401 211 3/2004

(Continued)

OTHER PUBLICATIONS

Wedi, "Adaptive Interpolation Filter for Motion Compensated Hybrid Video Coding," *Picture Coding Symposium*, 4 pp. (Apr. 2001).

(Continued)

*Primary Examiner* — Jay Patel
*Assistant Examiner* — Richard Torrente
(74) *Attorney, Agent, or Firm* — Klarquist Sparkman, LLP

(57) ABSTRACT

A video codec provides for encoding and decoding pictures of a video sequence at various coded resolutions, such that pictures can be encoded at lower coded resolutions based on bit rate or other constraints while maintaining a consistent display resolution. The video codec further provide for encoding and decoding pictures of the video sequence at ranges lower than that used for display, and then expanding the range after decoding for display. The video codec applies post-processing operations, such as de-blocking, de-ringing, and color conversion, at the native resolution and range of the decoded video, prior to range expansion and upsampling for display.

20 Claims, 11 Drawing Sheets

U.S. PATENT DOCUMENTS

| | | | |
|---|---|---|---|
| 6,259,741 | B1 | 7/2001 | Chen et al. |
| 6,324,301 | B1* | 11/2001 | Jacquin et al. ............... 382/166 |
| 6,339,434 | B1 | 1/2002 | West et al. |
| 6,418,166 | B1 | 7/2002 | Wu et al. |
| 6,456,663 | B1 | 9/2002 | Kim |
| 6,499,060 | B1 | 12/2002 | Wang et al. |
| 6,501,484 | B1 | 12/2002 | Porter |
| 6,510,177 | B1 | 1/2003 | De Bonet et al. |
| 6,600,785 | B1 | 7/2003 | Nishigori et al. |
| 6,728,317 | B1 | 4/2004 | Demos |
| 6,823,014 | B2 | 11/2004 | Kim |
| 6,937,291 | B1 | 8/2005 | Gryskiewicz |
| 7,039,115 | B1 | 5/2006 | Wu et al. |
| 7,236,526 | B1* | 6/2007 | Kitamura ............... 375/240.16 |
| 7,375,767 | B2 | 5/2008 | Lee et al. |
| 7,379,496 | B2 | 5/2008 | Holcomb et al. |
| 7,756,350 | B2 | 7/2010 | Vos et al. |
| 7,822,123 | B2 | 10/2010 | Lin et al. |
| 7,839,933 | B2 | 11/2010 | Srinivasan et al. |
| 2002/0064226 | A1 | 5/2002 | Bauer et al. |
| 2002/0186890 | A1 | 12/2002 | Lee et al. |
| 2003/0161401 | A1 | 8/2003 | Shen et al. |
| 2003/0185306 | A1* | 10/2003 | MacInnis et al. ........ 375/240.25 |
| 2004/0013195 | A1 | 1/2004 | Panusopone et al. |
| 2004/0042549 | A1 | 3/2004 | Huang et al. |
| 2004/0062307 | A1 | 4/2004 | Hallapuro et al. |
| 2004/0091174 | A1 | 5/2004 | Wang et al. |
| 2004/0161035 | A1 | 8/2004 | Wedi |
| 2004/0213345 | A1 | 10/2004 | Holcomb et al. |
| 2005/0105611 | A1 | 5/2005 | Bjontegaard |
| 2005/0105617 | A1 | 5/2005 | Chono |
| 2005/0190867 | A1 | 9/2005 | Sobchak et al. |
| 2005/0196073 | A1 | 9/2005 | MacInnis et al. |
| 2005/0207496 | A1 | 9/2005 | Komiya et al. |
| 2006/0072672 | A1 | 4/2006 | Lin et al. |
| 2006/0093036 | A1 | 5/2006 | Park et al. |
| 2006/0104349 | A1* | 5/2006 | Joch et al. ............... 375/240.03 |
| 2006/0120614 | A1 | 6/2006 | Flierl et al. |
| 2006/0210185 | A1 | 9/2006 | Sun |
| 2006/0222083 | A1 | 10/2006 | Klein Gunnewiek |
| 2007/0098079 | A1* | 5/2007 | Boyce et al. ............ 375/240.25 |
| 2007/0160153 | A1 | 7/2007 | Sullivan |

FOREIGN PATENT DOCUMENTS

| | | |
|---|---|---|
| EP | 1 617 672 | 1/2006 |
| JP | 4-207684 | 7/1992 |
| JP | 2000-134618 | 5/2000 |
| JP | 2000-165866 | 6/2000 |
| RU | 2191469 | 10/2002 |
| SU | 1506554 | 9/1989 |
| WO | WO 98/41029 | 9/1998 |
| WO | WO 00/33581 | 6/2000 |
| WO | WO 01/95633 | 12/2001 |
| WO | WO 02/054777 | 7/2002 |
| WO | WO 03/007619 | 1/2003 |
| WO | WO 2006/006777 | 1/2006 |
| WO | WO 2006/109135 | 10/2006 |
| WO | WO 2006/112620 | 10/2006 |

OTHER PUBLICATIONS

Wedi, "Adaptive Interpolation Filter for Motion Compensated Prediction," *IEEE*, 4 pp. (Dec. 2002).

Wedi, "Adaptive Interpolation Filters and High-Resolution Displacements for Video Coding," *IEEE Trans. on Circuits and Systems for Video Technology*, pp. 484-491 (Apr. 2006).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video!," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Brainard et al., "Composite Television Coding: Subsampling and Interpolation," *SMPTE Journal*, pp. 717-724 (Aug. 1982).

Einarsson et al., "Mixed Resolution Video Coding for Low Bit-Rate Channels," *Proc. Int'l Workshop on Coding Techniques for Very Low Bit-rate Video: VLBV97*, Linköping, Sweden, pp. 77-80 (Jul. 1997).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Anonymous, "DivX Multi Standard Video Encoder," 2 pp.

Catmull et al., "A Class of Local Interpolating Splines," Computer Aided Geometric Design, Academic Press, pp. 317-326 (1974).

Dufaux et al., "Abstract: Motion-compensated generic coding of video based on a multi resolution data structure," 2 pp. (1993) [downloaded from the World Wide Web on Jan. 25, 2006].

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Oct. 2005).

Keys, "Cubic Convolution Interpolation for Digital Image Processing," Computer Graphics, vol. ASSP-29, No. 6, pp. 1153-1160 (Dec. 1981).

Mitchell et al., "Reconstruction Filters in Computer Graphics," Computer Graphics, vol. 22, No. 4 pp. 221-228 (Aug. 1988).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Wien, "Variable Block-Size Transforms for Hybrid Video Coding," Dissertation, 182 pp. (Feb. 2004).

Beerman et al., "Low-complexity Spatial Up-scaling Methods for Low-resolution Video Coding," 6 pp. (2004).

Dufaux et al., "Motion-compensated generic coding of video based on a multi resolution data structure," Optical Engineering, vol. 32, No. 7, pp. 1559-1570 (Jul. 1993).

Meijering, A Chronology of Interpolation: From Ancient Astronomy to Modern Signal and Image Processing,: IEEE vol. 90, No. 3, pp. 319-342 (Mar. 2002).

Meijering, "Prolog to a Chronology of InterpolationL From Ancient Astronomy to Modern Signal and Image Processing," IEEE vol. 90, No. 3, pp. 317-318 (Mar. 2002).

Meijering et al., "A Note on Cubic Convolution Interpolation," IEEE Transactions on Image Processing, vol. 12, No. 4, pp. 477-479 (Apr. 2003).

Regunathan, "Flexible 4-tap Filters for Texture Upsampling in Spatial Scalability," JVT-U123, Hangzhou, China, 10 pp. (Oct. 2006).

Regunathan, "Flexible 4-tap Filters for Texture Upsampling in Spatial Scalability," JVT-V074, Marrakech, Morocco, 14 pp. (Jan. 2007).

Segall et al., "Adaptive Upsampling for Spatially Scalable Coding," JVT-O010, Busan, KR, 10 pp. (Apr. 2005).

Segall, "CE4: Evaluation of Texture Upsampling with 4-tap Cubic-Spline Filter," JVT-U042, Hangzhou, China, 6 pp. (Oct. 2006).

Srinivasan et al., "Windows Media Video 9: Overview and Applications," *Signal Processing: Image Communication*, vol. 19, No. 9, pp. 851-875 (Oct. 2004).

Sullivan, "Resampling Filters for SVC Upsampling," JVT-R066, Meeting: Bangkok, Thailand, 9 pp. (Jan. 2006).

Sun, "Texture Upsampling with 4-tap Cubic-Spline Filter," JVT-T057r1, Klagenfurt, Austria, 8 pp. (Jul. 2006).

Sun, "Upsampling Filter Design with Cubic Splines," JVT-S016, Geneva, Switzerland, 9 pp. (Mar.-Apr. 2006).

Tu et al., "CE4: 4-tap Motion Compensation Interpolation Filter for High Resolution SVC Enhancement Layers," JVT-W068, 9 pp. (Apr. 2007).

Volleberg et al., "Generic Topology for FIR Filter Based Up- and Down-Sampling," 4 pp. (Apr. 2004).

* cited by examiner

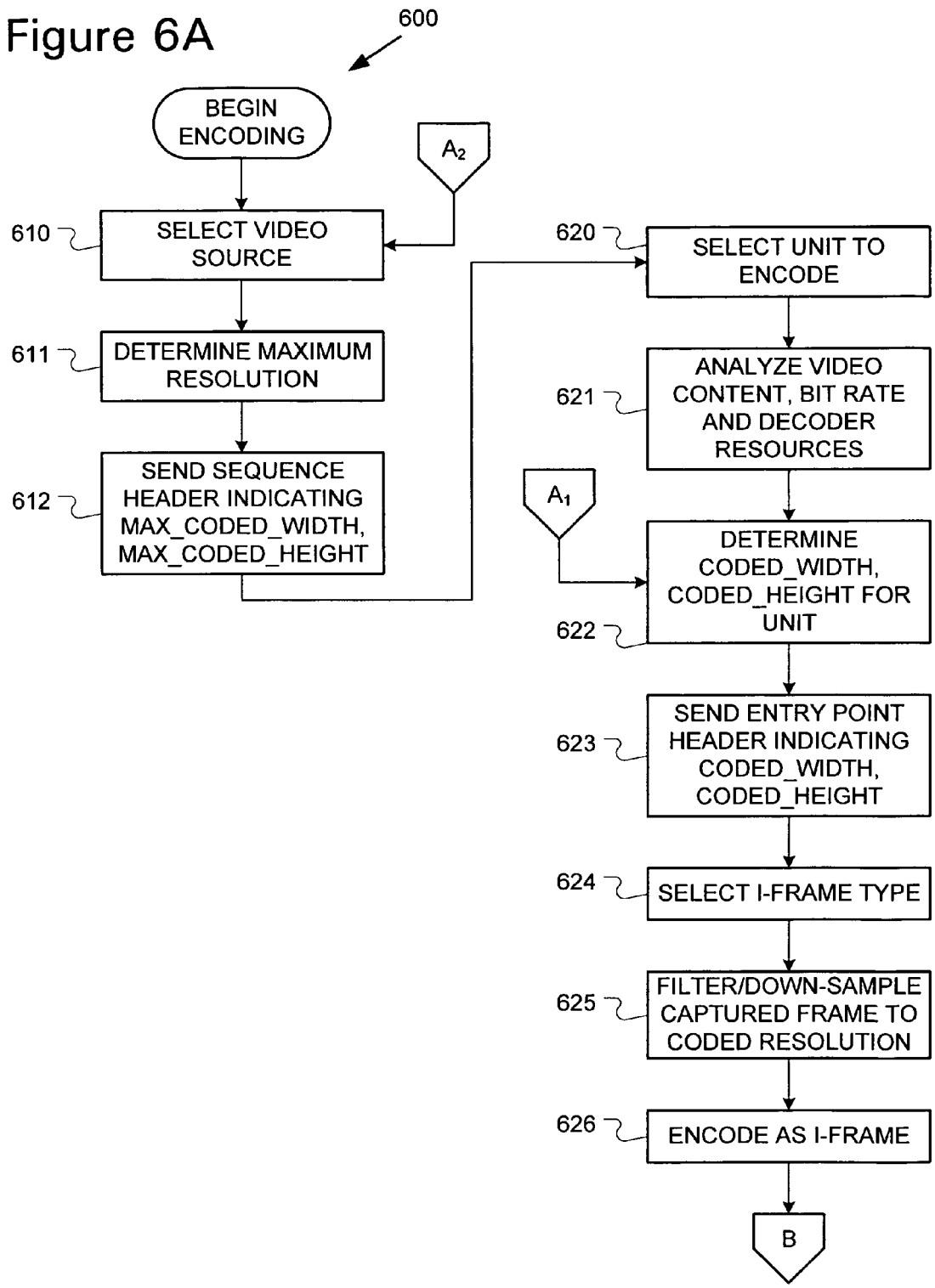

Software 980 Implementing Video Encoder/Decoder With Variable Coding Resolution

Figure 11

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | 0 | 1 | 1 |
| 1 | 1 | 0 | 0 | 0 | 0 | 0 | 1 | 1 | 1 |
| 1 | 1 | 1 | 0 | 0 | 0 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 0 |
| 1 | 1 | 1 | 1 | 1 | 1 | 1 | 1 | 0 | 0 |

Figure 12

| 1 | 2 | 1 |
|---|---|---|
| 2 | 4 | 2 |
| 1 | 2 | 1 |

DECODING VARIABLE CODED RESOLUTION VIDEO WITH NATIVE RANGE/RESOLUTION POST-PROCESSING OPERATION

CROSS-REFERENCE TO RELATED APPLICATION

This is a continuation-in-part of U.S. patent application Ser. No. 10/960,356, entitled, "Variable Coding Resolution In Video Codec," which was filed on Oct. 6, 2004, the disclosure of which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to techniques for digitally encoding, decoding and processing video, images and other digital media content.

BACKGROUND

Multiple resolution video encoding and decoding is described, inter alia, in Holcomb et al., "Multi-resolution Video Coding and Decoding," U.S. patent application Ser. No. 10/644,258, filed Aug. 19, 2003 (the disclosure of which is hereby incorporated herein by reference) [hereafter the '258 patent Application]. In multi-resolution video encoding, the video encoder may adaptively change or lower the coded size of video frames within a video sequence relative to the nominal video size so as to reduce blocking artifacts at low bitrates (among other reasons). For video frames coded at lower resolution, the frame is down-sampled at the encoder to permit coding at a lower resolution, then up-sampled at the decoder to maintain a consistent display resolution. One implementation of the multiple resolution video encoding and decoding techniques described in the '258 patent application is incorporated in the main coding profile of the Windows Media Video version 9 (WMV-9) video codec distributed and licensed by Microsoft Corporation of Redmond, Wash., USA.

In the WMV-9 video codec's main coding profile, the video encoder communicates the coding resolution to the decoder using elements of the codec's bit stream syntax. In particular, the bit stream syntax includes a multi-resolution flag syntax element (labeled "MULTIRES") at the sequence header that indicates whether or not there could be resolution changes within the bit stream, and also includes a two-bit picture resolution syntax element (labeled "RESPIC") at the picture header to signal a reduction in resolution by a factor of two (i.e., reduction to one-half the display resolution) in the horizontal or vertical dimensions of the picture. The sequence header is carried at the level of the file container (e.g., the "ASF" format file container), externally from the encoded video bit stream contained therein.

SUMMARY

Various video codec tools and techniques described herein provide for variable coding resolution in an encoded video sequence that improves upon the prior multiple resolution video coding and decoding. This feature allows a decoder to maintain a consistent video display resolution, while providing an encoder with the flexibility to choose to encode some portion or portions of the video at an actual coded resolution lower than the display resolution. When desired to use the lower coding resolution, the encoder filters and down-samples the portions of the video content to the lower resolution. Upon receiving such lower resolution portions, the decoder filters and up-samples the decoded content for display at the display resolution. For example, it may be desirable for the encoder to code some portions of the video content at the lower coded resolution so that such portions can be represented at a lower encoded bit-rate than necessary to encode the picture at the full display resolution, or to save processing power by encoding a smaller picture.

In one implementation described herein, a video codec employs a coding syntax for the encoded video bit-stream that includes syntax elements to flexibly signal variable coding resolution for some portion of the pictures in the video sequence. The coding syntax includes syntax elements (labeled "MAX_CODED_WIDTH," and "MAX_CODED_HEIGHT," in this implementation) carried in a sequence header inside the video bit-stream, which specify the picture dimensions at the full display resolution. The coding syntax further includes syntax elements (a flag labeled "CODED_SIZE", and parameters labeled "CODED_WIDTH" and "CODED_HEIGHT," in this implementation) in an entry-point header of the video bit-stream. The "CODED_SIZE" flag indicates that the sub-sequence of pictures beginning at the entry point are coded at a lower coding resolution specified by the "CODED_WIDTH" and "CODED_HEIGHT" parameters. The entry point headers signal entry-points into the video bit-stream at which decoding can commence as described in Holcomb et al., "Signaling Valid Entry Points In A Video Stream," U.S. patent application Ser. No. 10/882,739, filed Jun. 30, 2004 [hereafter the "Entry-Point Patent Application"], and claiming priority to U.S. Provisional Patent Application No. 60/520,543, filed Nov. 13, 2003, the disclosures of which are hereby incorporated herein by reference.

This improved variable video coding resolution implementation has the advantage of carrying parameters that specify the dimensions of the display resolution within the video bit stream, and not merely in the file container. Further, the lower coding resolution for a portion of the video is signaled in this improved variable video coding resolution implementation at the entry point level. As discussed in the Entry-Point Patent Application, the entry points coincide with one or more sub-sequences or groups of pictures of the video sequence that begins with an intra-coded frame (also referred to as an "I-frame"), and also may contain one or more predictive-coded frames (also referred to as a "P-frame") that are predictively coded relative to that intra-coded frame. The lower coding resolution signaled at the entry point thus applies to a group of pictures that includes an I-frame and the P-frames that reference the I-frame. By signaling the lower coding resolution for such groups of pictures, the decoder can then avoid resampling "within the loop." In other words, the resolution of a reconstructed I-frame need not be resampled to the resolution of the P-frames that reference it, in order to decode the P-frames. This further allows the use of a separate out-of-loop resampler after the decoder to up-sample the pictures to the display resolution.

In an implementation of a video decoder described herein that utilizes the variable resolution coding technique, the video decoder optionally applies one or more post processing operations prior to range expansion and/or re-sampling to the display resolution. The optional post-processing operations can include de-blocking, de-ringing or other artifact removal, range remapping, color conversion and other like processes.

Additional features and advantages of the invention will be made apparent from the following detailed description of embodiments that proceeds with reference to the accompanying drawings.

BRIEF DESCRIPTION OF THE DRAWINGS

FIGS. 6A-B are a flow diagram of a method utilized in the encoder of FIG. 2 for encoding a video sequence using variable coding resolution.

FIG. 11 is a diagram illustrating binary indices used for adaptive filtering as part of a de-ringing filter optionally applied to pictures by the video decoder of FIG. 3.

FIG. 12 is a diagram illustrating a filter mask for adaptive smoothing as part of a de-ringing filter optionally applied to pictures by the video decoder of FIG. 3.

DETAILED DESCRIPTION

The following description is directed to implementations of an improved variable coding resolution technique that permits portions of a video sequence to be variably coded at lower resolutions. An exemplary application of this technique is in a video codec system. Accordingly, the variable coding resolution technique is described in the context of an exemplary video encoder/decoder utilizing an encoded bit stream syntax. In particular, one described implementation of the improved variable coding resolution technique is in a video codec that complies with the advanced profile of the VC-1 video codec standard (also known as the SMPTE 421M standard). Alternatively, the technique can be incorporated in various video codec implementations and standards that may vary in details from the below described exemplary video codec and syntax.

1. Video Source, Coding and Communication System

Figure 1:
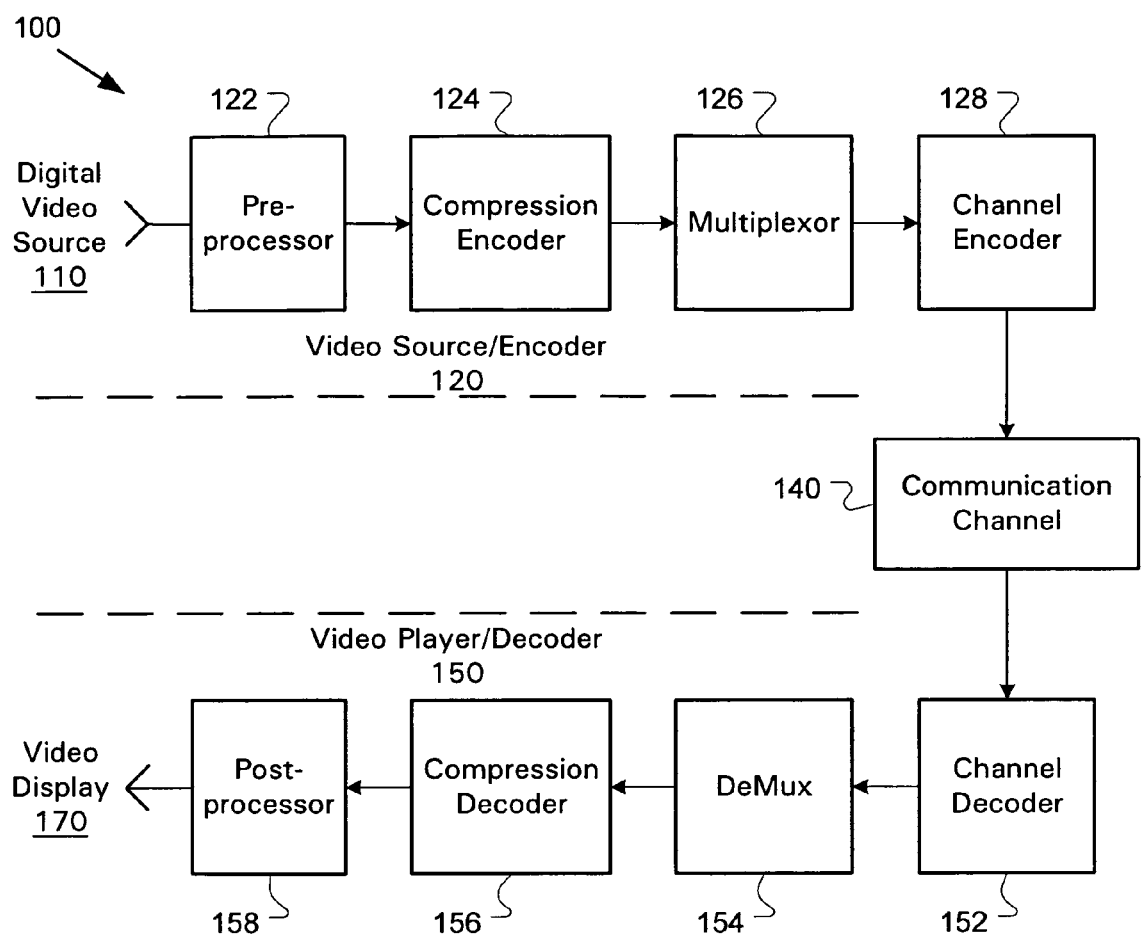
FIG. 1 is a block diagram of a video codec incorporating an improved variable coding resolution technique described herein.

FIG. 1 illustrates deployment of a video capture and playback system 100 employing a video codec in which the variable coding resolution technique is implemented in a typical application or use scenario. The video capture and playback system 100 generally includes a video source/encoder 120 that captures and encodes video content from an input digital video source 110 into a compressed video bit stream on a communication channel 140, and a video player/decoder 150 that receives and decodes the video from the channel and displays the video on a video display 170. Some examples of such systems in which the below described video codec with variable coding resolution can be implemented encompass systems in which the video capture, encoding, decoding and playback are all performed in a single machine, as well as systems in which these operations are performed on separate, geographically distant machines. For example, a digital video recorder (or personal computer with a TV tuner card) can capture a video signal and encode the video to hard drive, as well as read back, decode and display the video from the hard drive on a monitor. As another example, a commercial publisher or broadcaster of video can use a video mastering system incorporating the video encoder to produce a video transmission (e.g., a digital satellite channel, or Web video stream) or a storage device (e.g., a tape or disk) carrying the encoded video, which is then used to distribute the video to user's decoder and playback machines (e.g., personal computer, video player, video receiver, etc.).

In the illustrated system 100, a video source/encoder 120 includes a source pre-processor 122, a source compression encoder 124, a multiplexor 126 and a channel encoder 128. The pre-processor 122 receives uncompressed digital video from a digital video source 110, such as a video camera, analog television capture, or other sources, and processes the video for input to the compression encoder 124. The compression encoder 124 (such as the video encoder 200 of FIG. 2 described below) performs compression and encoding of the video, as discussed below. The multiplexor 126 delivers the resulting compressed video bit stream to the channel encoder 128 for encoding onto the communication channel 140. The communication channel can be a video transmission (e.g., digital television broadcast, satellite or other over-the-air transmission; or cable, telephone or other wired transmission), recorded video media (e.g., computer hard drive or other storage disk; tape, optical disk (DVD) or other removable recorded medium). The channel encoder 128 encodes the compressed video bit stream into a file container, transmission carrier signal or the like.

At the video player/decoder 150, a channel decoder 152 decodes the compressed video bit stream on the communication channel. A demultiplexor 154 delivers the compressed video bit stream from the channel decoder to a compression decoder 156 (such as the video decoder 300 of FIG. 3, described below). The compression decoder then decodes and reconstructs the video from the compressed video bit stream. Finally, the post-processor 158 processes the video to be displayed on a video display 170.

2. Generalized Video Encoder and Decoder

Figure 2:
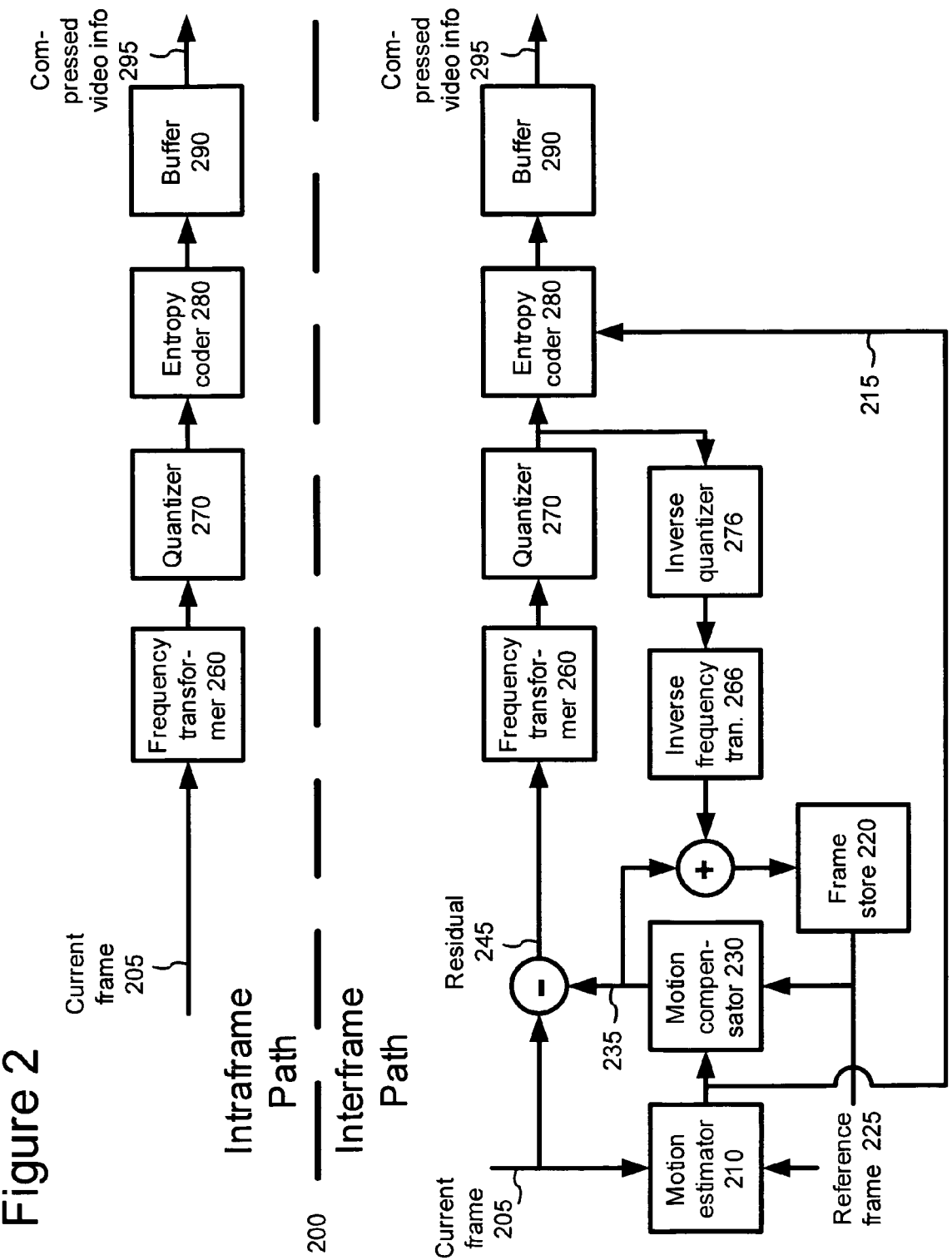
FIG. 2 is a block diagram of a video encoder in the video codec of FIG. 1.
Figure 3:
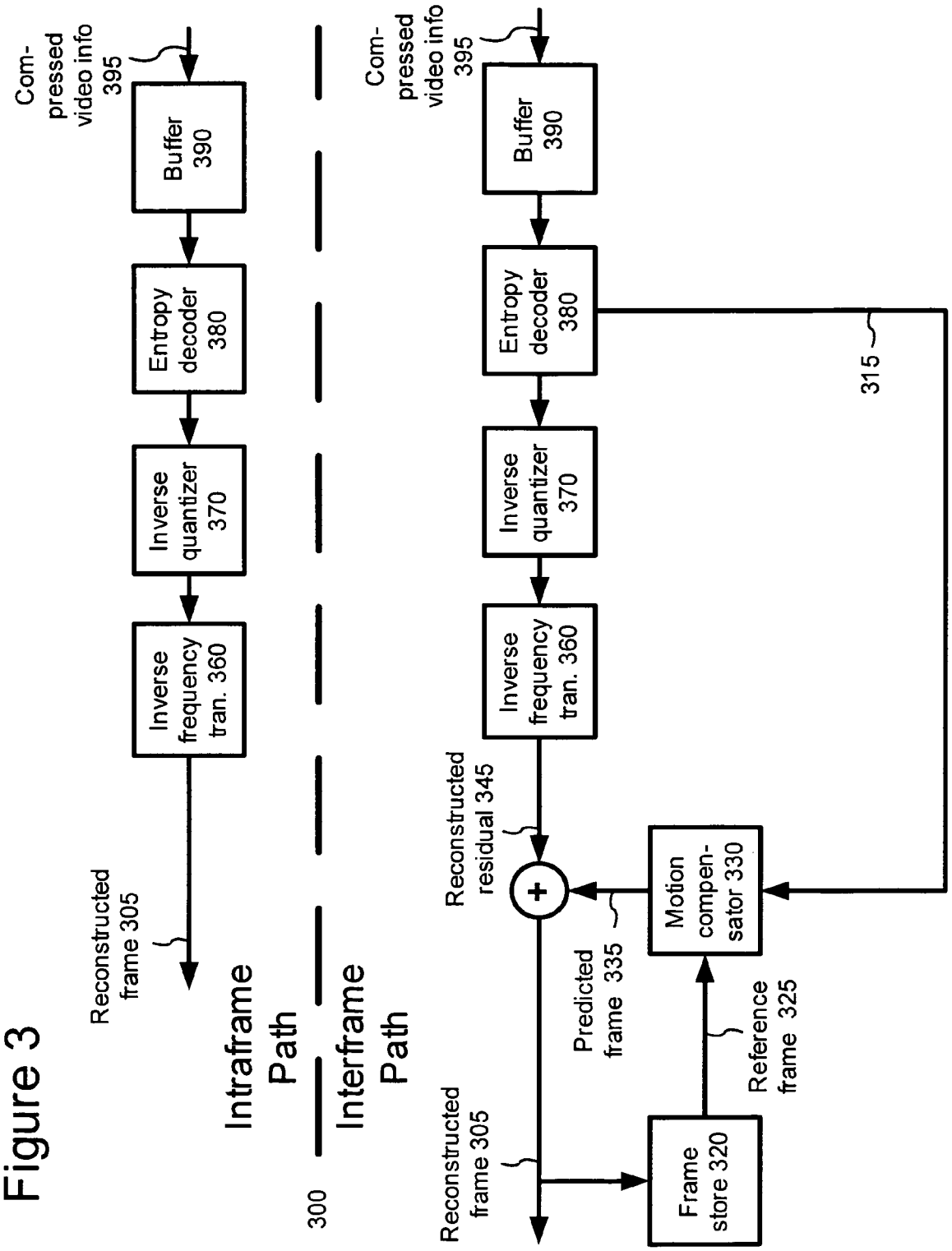
FIG. 3 is a block diagram of a video decoder in the video codec of FIG. 1.

FIG. 2 is a block diagram of a generalized video encoder (200) and FIG. 3 is a block diagram of a generalized video decoder (300), in which the variable coding resolution technique can be incorporated.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (200) and decoder (300) are block-based and use a 4:2:0 macroblock format with each macroblock including 4 luminance 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks. The macroblock may be used to represent either progressive or interlaced video content.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system (200). The encoder system (200) receives a sequence of video frames including a current frame (205), and produces compressed video information (295) as output. Particular embodiments of video encoders typically use a variation or supplemented version of the generalized encoder (200).

The encoder system (200) compresses predicted frames and key frames. For the sake of presentation, FIG. 2 shows a path for key frames through the encoder system (200) and a path for forward-predicted frames. Many of the components of the encoder system (200) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) outputs as side information motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

A frequency transformer (260) converts the spatial domain video information into frequency domain (i.e., spectral) data. For block-based video frames, the frequency transformer (260) applies a transform described in the following sections that has properties similar to the discrete cosine transform ["DCT"]. In some embodiments, the frequency transformer (260) applies a frequency transform to blocks of spatial prediction residuals for key frames. The frequency transformer (260) can apply an 8×8, 8×4, 4×8, or other size frequency transforms.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame. If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. In some embodiments, the encoder applies a de-blocking filter to the reconstructed frame to adaptively smooth discontinuities in the blocks of the frame.

The entropy coder (280) compresses the output of the quantizer (270) as well as certain side information (e.g., motion information (215), quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bitrate adaptive modules. The compressed video information (295) is depleted from the buffer (290) at a constant or relatively constant bitrate and stored for subsequent streaming at that bitrate. Alternatively, the encoder system (200) streams compressed video information immediately following compression.

Before or after the buffer (290), the compressed video information (295) can be channel coded for transmission over the network. The channel coding can apply error detection and correction data to the compressed video information (295).

B. Video Decoder

FIG. 3 is a block diagram of a general video decoder system (300). The decoder system (300) receives information (395) for a compressed sequence of video frames and produces output including a reconstructed frame (305). Particular embodiments of video decoders typically use a variation or supplemented version of the generalized decoder (300).

The decoder system (300) decompresses predicted frames and key frames. For the sake of presentation, FIG. 3 shows a path for key frames through the decoder system (300) and a path for forward-predicted frames. Many of the components of the decoder system (300) are used for compressing both key frames and predicted frames. The exact operations performed by those components can vary depending on the type of information being compressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the frame (305) being reconstructed. For example, the motion compensator (330) uses a macroblock motion vector to find a macroblock in the reference frame (325). A frame buffer (320) stores previous reconstructed frames for use as reference frames. Alternatively, a motion compensator applies another type of motion compensation. The prediction by the motion compensator is rarely perfect, so the decoder (300) also reconstructs prediction residuals.

When the decoder needs a reconstructed frame for subsequent motion compensation, the frame store (320) buffers the reconstructed frame for use in predicting the next frame. In some embodiments, the encoder applies a de-blocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse transform described in the following sections. In some embodiments, the inverse frequency transformer (360) applies an inverse frequency transform to blocks of spatial prediction residuals for key frames. The inverse frequency transformer (360) can apply an 8×8, 8×4, 4×8, or other size inverse frequency transforms.

2. Variable Coding Resolution

As discussed in the summary section above, the variable coding resolution technique permits the decoder to maintain a consistent video display resolution, while allowing the encoder the flexibility to choose to encode some portion or portions of the video at an actual coded resolution lower than the display resolution. The encoder can code some pictures of the video sequence at lower coded resolutions to achieve a lower encoded bit-rate than would be required to encode the picture at the full display resolution, or to save processing power by encoding a smaller picture. When desired to use the lower coding resolution, the encoder filters and down-samples the picture(s) to the lower resolution. At decoding, the decoder filters and up-samples the decoded content for display at the display resolution.

As described more fully below, the encoder 200 specifies the maximum resolution in a sequence header within the compressed video bit stream 295 (FIG. 2). In one coding syntax implementation described herein, the maximum resolution is specified using a MAX_CODED_WIDTH and MAX_CODED_HEIGHT syntax elements in the sequence header. Coding the maximum resolution in the sequence header of the video bit stream (as compared to header information carried outside the bit stream, such as in header information of a container file format, or transmission carrier format) has the advantage that the maximum resolution is directly decodable by the video decoder. The maximum resolution does not have to be separately passed to the video decoder by the container file or transmission carrier decoder (e.g., channel decoder 152).

The encoder 200 further signals that a group of one or more pictures following an entry point in the video bit-stream is coded at a lower resolution using a flag (e.g., a CODED_SIZE_FLAG syntax element described below) in the entry point header. If this flag indicates a lower coding resolution, the coded size is also coded in the entry point header (using CODED_WIDTH and CODED_HEIGHT syntax elements described below). By signaling a lower coding resolution for the group at the entry point level, the codec can avoid a need for the decoder to resample within the video decoding loop. More particularly, intra-coded frames (I-frames) in the group following an entry point header are coded at the same coded resolution as predicted frames in the group. In this way, the I-frame(s) need not be re-sampled to decode the predicted frames whose decoding depend upon such I-frame(s).

The separate coded width and coded height elements also permit the encoder to more flexibly specify coding resolutions. For example, the coded resolution is not limited to being one half the width and/or height of the display resolution, as in the main coding profile of the WMV-9 video codec discussed in the background section above.

3. Syntax Structure

Figure 4:
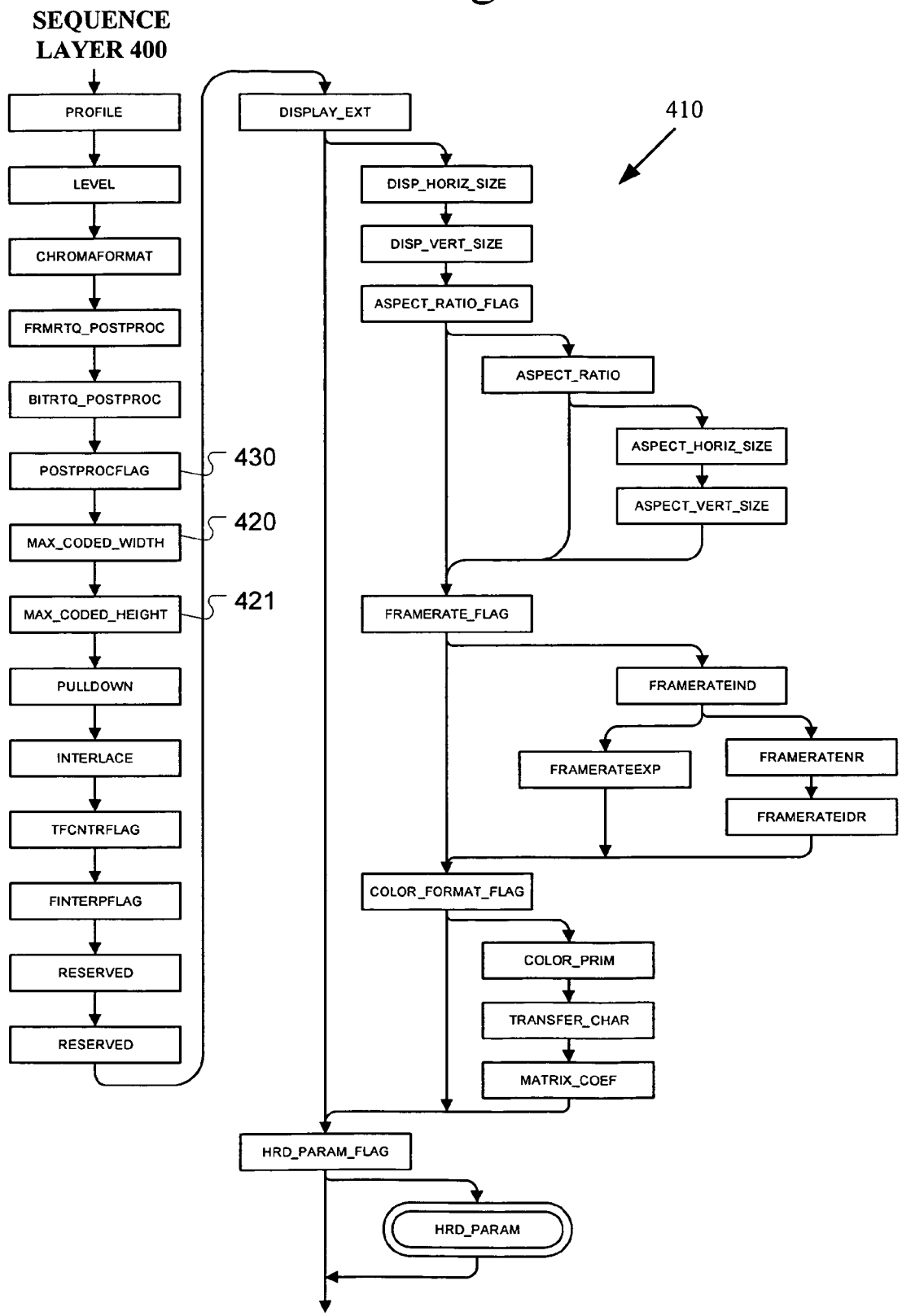
FIG. 4 is a syntax diagram of a sequence header in accordance with a coding syntax of the compressed bitstream utilized by the video encoder/decoder employing variable coding resolution.
Figure 5:
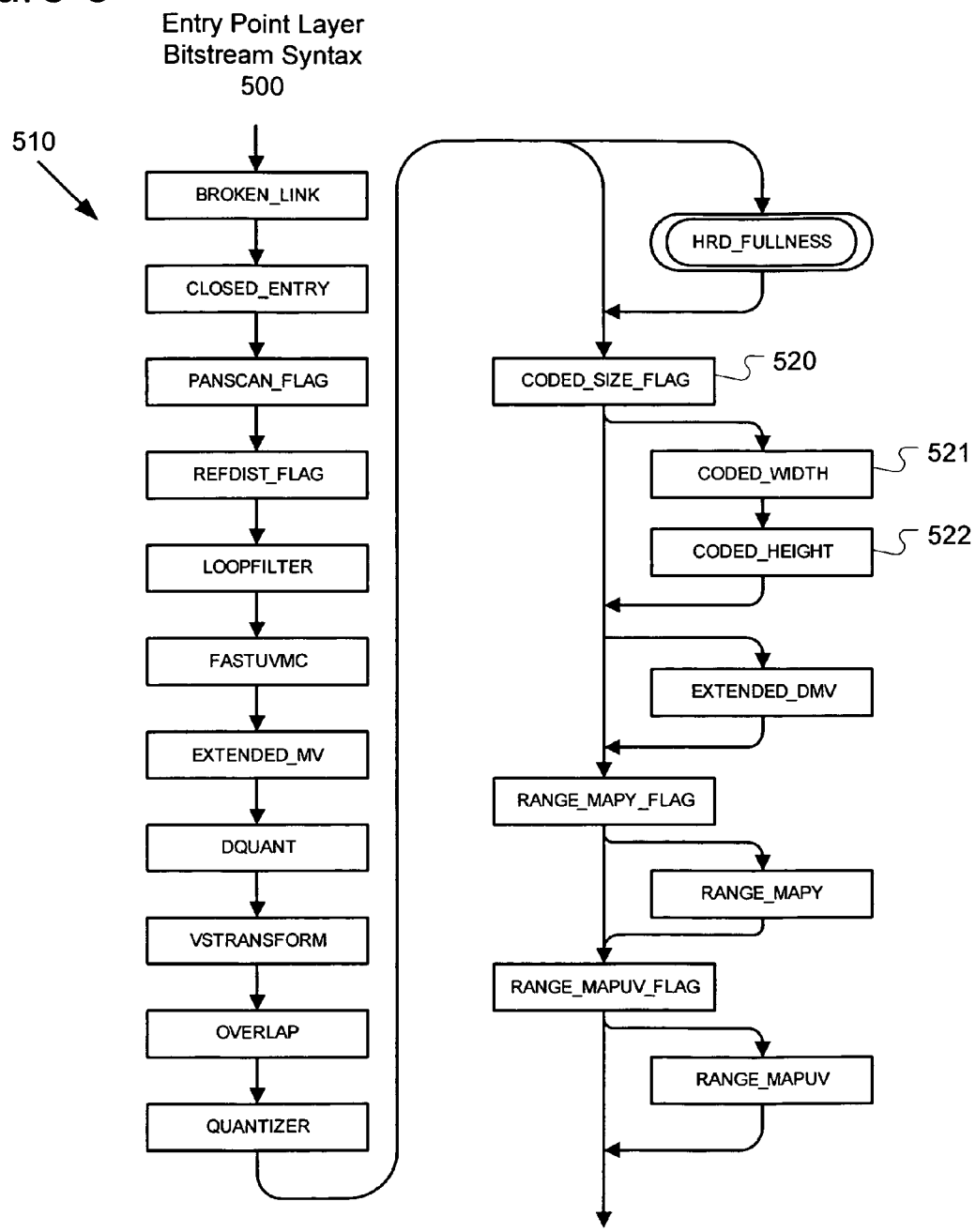
FIG. 5 is a syntax diagram of an entry point header in accordance with a coding syntax of the compressed bitstream utilized by the video encoder/decoder employing variable coding resolution.

With reference to FIGS. 4 and 5, the compressed video bitstream 295 (FIG. 2) includes information for a sequence of compressed progressive video frames or other pictures (e.g., interlace frame or interlace field format pictures). The bitstream is organized into several hierarchical layers that are decoded by a decoder such as the decoder (300) of FIG. 3. The highest layer is the sequence layer, which has information for the overall sequence of frames. Additionally, each compressed video frame is made up of data that is structured into three hierarchical layers: picture, macroblock, and block (from top to bottom). Alternative video implementations employing the variable coding resolution technique can utilize other syntax structures having various different compositions of syntax elements.

Further, the compressed video bit stream can contain one or more entry points. As discussed more fully in the Entry-Point Patent Application, valid entry points in a bitstream are locations in an elementary bitstream from which a system (e.g., a receiver, a video splicer, a commercial insertion tool, a video editor, a summarization engine, etc.) can decode or process the bitstream without the need of any preceding information (bits) in the bitstream. Frames that can be decoded without reference to preceding frames are typically referred to as "key" frames.

An entry point is signaled in a bitstream by an entry point indicator. The purpose of an entry point indicator is to signal the presence of a special location in a bitstream to begin or resume decoding (e.g., where there is no dependency on past decoded video fields or frames to decode the video frame following immediately the entry point indicator). Entry point indicators can be inserted at regular or irregular intervals in a bitstream. Therefore, an encoder can adopt different policies to govern the insertion of entry point indicators in a bitstream.

FIG. 4 is a syntax diagram for the sequence layer 400, which includes a sequence header 410 followed by data for the picture layer 500 (see FIG. 5). The sequence header 410 includes several sequence-level elements that are processed by the decoder and used to decode the sequence. The elements that make up the sequence header 410 include a maximum coded width (MAX_CODED_WIDTH) element 420, and a maximum coded height (MAX_CODED_HEIGHT) element 421, among others.

The MAX_CODED_WIDTH element 420 specifies the maximum horizontal size of the coded picture within the sequence. In the illustrated implementation, this syntax element is a 12-bit binary encoding of sizes. The maximum horizontal size of the picture is equal to the value of this field multiplied by 2, plus 2. The horizontal size of the coded pictures in the video sequence may change at an entry point but is always less than, or equal to, MAX_CODED_WIDTH. Alternative implementations can utilize a maximum coded width syntax element having a different size and/or specifying the maximum horizontal size in a different way.

The MAX_CODED_HEIGHT element 421 specifies the maximum vertical size of the coded picture within the video sequence. In the illustrated implementation, this syntax element is a 12-bit binary encoding of sizes. The maximum vertical size of the picture is equal to the value of this field multiplied by 2, plus 2. The vertical size of the coded pictures in the video sequence may change at an entry point but is always less than, or equal to, MAX_CODED_HEIGHT. Alternative implementations can utilize a maximum coded height syntax element having a different size and/or specifying the maximum vertical size in a different way.

FIG. 5 is a syntax diagram for the entry point layer 500. The entry point layer 500 includes an entry point header 510 followed by data for a group of pictures forming an entry point segment. The entry point header 510 includes several entry point-level elements that are processed by the decoder and used to decode the following picture frames without reference to preceding picture data in the video sequence. The elements that make up the entry point header include a coded size flag (CODED_SIZE_FLAG) element 520, a coded width (CODED_WIDTH) element 521, and a coded height (CODED_HEIGHT) element 522, among others.

The CODED_SIZE_FLAG signals a different coded resolution for pictures in the entry point segment. In the illustrated implementation, the CODED_SIZE_FLAG element 520 is a 1-bit syntax element. A value of one (CODED_SIZE_FLAG=1) indicates that the CODED_WIDTH and CODED_HEIGHT syntax elements are also present in the entry header. Otherwise, a flag value of zero (CODED_SIZE_FLAG=0) indicates that the CODED_WIDTH and CODED_HEIGHT syntax elements are not present in the entry header; and the width and height of the frames within the entry point segment are specified by the MAX_CODED_WIDTH and MAX_CODED_HEIGHT syntax elements in the sequence header. Alternative implementations can utilize a different format flag or value to signal a group of pictures in the video sequence has a different coded size.

The CODED_WIDTH element 521 specifies the coded horizontal size of pictures in the entry point segment. In the illustrated implementation, the CODED_WIDTH element 521 is a 12 bit syntax element that is present if CODED_SIZE_FLAG=1. It specifies the coded width of the frames within the entry point segment in units of 2 pixels. The coded width of the frames within the entry point segment is equal to the value of this field multiplied by 2, plus 2. Therefore, the range is 2 to 8192. Alternative implementations can use a different syntax element format to signal the coded horizontal picture size.

Similarly, the CODED_HEIGHT element 522 specifies the coded vertical size of pictures in the entry point segment. The CODED_HEIGHT element is a 12 bit syntax element that is present if CODED_SIZE_FLAG=1. It specifies the coded height of the frames within the entry point segment in units of 2 pixels. The coded height of the frames within the entry point segment is equal to the value of this field multiplied by 2, plus 2. Therefore, the range is 2 to 8192. Alternative implementations can use a different syntax element format to signal the coded vertical picture size.

The frame layer (not shown) may include a syntax element, POSTPROC, by which the encoder signals whether to apply various post-processing operations (detailed more fully below) to the respective frame after decoding. In the illustrated implementation of the syntax, POSTPROC is a 2-bits syntax element that occurs in all pictures when the sequence level flag POSTPROCFLAG element 430 is set to 1. It is used to suggest to the decoder on the level of post processing that should be used for the current frame. The four suggested modes are tabulated below:

| POSTPROC | Suggested Post processing |
| --- | --- |
| 00 | No Post Processing |
| 01 | De-blocking |
| 10 | De-ringing |
| 11 | De-block + De-ringing |

The compression decoder preferably performs these two post processing steps as indicated by the values above. Illustrative implementations of the de-blocking and de-ringing operations are detailed more fully below. If both post-processing steps are performed, de-blocking preferably is performed before de-ringing.

3. Encoding with Variable Coded Resolution

Figure 6B:
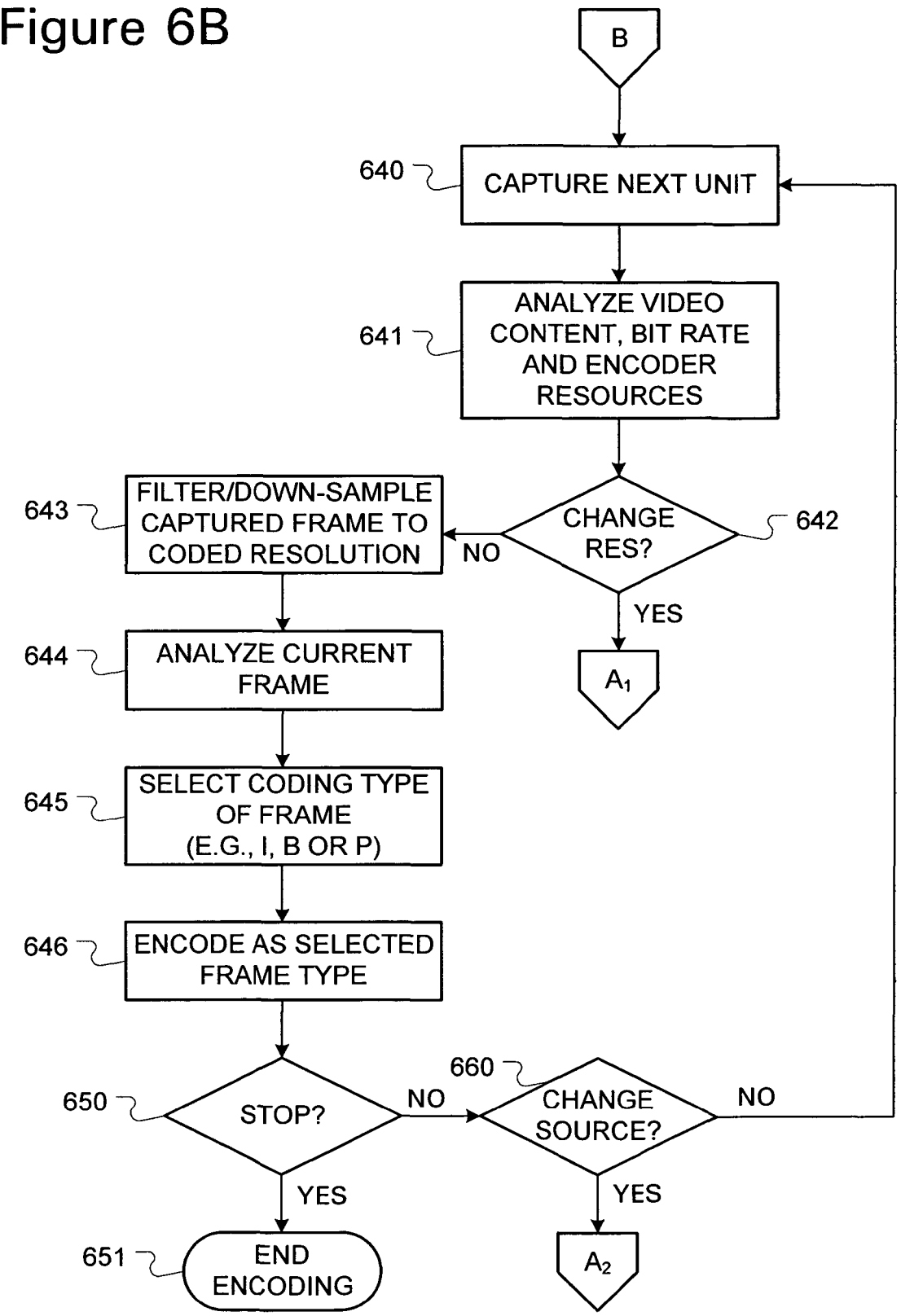

FIGS. 6A-B show operations performed in the compression encoder 124 (FIG. 1) to encode a video sequence using variable coded resolution. The illustrated encoding process is simplified to show those operations directly involved in the variable coded resolution technique. However, it should be understood to those skilled in the art that compression encoding of the video sequence involves many more operations as generally summarized above for the exemplary video encoder 200 (FIG. 2). Alternative implementations of the compression encoder can perform the variable coded resolution using fewer, more or a different arrangement of operations.

In the illustrated variable coded resolution encoding process 600, the compression encoder begins operation by selecting a source of the video content to be encoded (e.g., a camera or other digital video input) at operation 610. At operation 611, the compression encoder then determines a maximum resolution to use in encoding the video content, such as by determining the source resolution of the video, by determining the maximum decoding capability of the target decoder, or other determination basis. The compression encoder then sends the sequence header for the compressed video bit stream, including the MAX_CODED_WIDTH and MAX_CODED_HEIGHT elements indicating this maximum coding resolution at operation 612.

At operation 620, the compression encoder selects a unit of the video content to encode (e.g., a single frame, but alternatively other independently encodable units of the video content can be used, such as a slice or other partial picture unit, or group of multiple pictures). The encoding order need not be the same as received from the video source (e.g., when B-frame re-ordering is used). However, for ease of explanation, such re-ordering techniques are not further detailed.

The compression encoder analyzes the content of the unit to be encoded, the available bit rate of the communication channel 140 (FIG. 1), and the computational resources available in the encoder for encoding the unit at operation 621. At operation 622, the compression encoder determines a coded resolution for the unit based on this analysis. For example, the encoder can determine to lower the coded resolution for encoding the unit when the available bit rate is low, the nature of the content cannot be compressed as effectively without perceptible loss of quality, and/or the available encoding resources is temporarily reduced. In alternative implementations, the encoder's determination of the coded resolution can be based on fewer or additional analyses than these. At operation 623, the compression encoder then sends an entry point header containing a CODED_SIZE flag to indicate the presence of the CODED_WIDTH and CODED_HEIGHT elements, along with the CODED_WIDTH and CODED_HEIGHT elements specifying the coded resolution for the unit.

The compression encoder then proceeds to encode the unit, by selecting the I-frame coding type for the picture (operation 624), filtering and down-sampling the picture to the coded resolution (operation 625), and encoding the down-sampled picture as the selected I-frame coding type.

The compression encoder continues by capturing or acquiring a next unit of video from the source at operation 640. The compression encoder again analyzes the video content, available bit rate and encoder computational resources at operation 641. Based on these analyses, the compression encoder determines if the coded resolution needs to be changed. Again, alternative implementations may vary in the analyses upon which this determination is based. If the coded resolution is to change, the compression encoder returns to the determination of a new coded resolution for this next unit at operation 622. Otherwise, the compression encoder proceeds to encode the next unit by filtering and down-sampling the picture to the coded resolution (operation 643), analyzing the current frame (operation 644) and selecting an appropriate coding type (e.g., I-frame, B-frame or P-frame) for the frame (operation 645), and encoding the down-sampled frame as the selected type.

The compression encoder then checks whether the encoding process should cease (e.g., based on user input) at operation 650. If so, the compression encoder ends the compressed video bit stream and ceases the encoding operation.

If the encoding is to continue, the compression encoder further checks whether the source of video input is to change at operation 660. If so, the compression encoder loops to selecting the video source at operation 610.

Otherwise, the compression encoder continues to capture and encode the next unit of the video sequence at operation 640.

4. Decoding with Variable Coded Resolution

Figure 7:
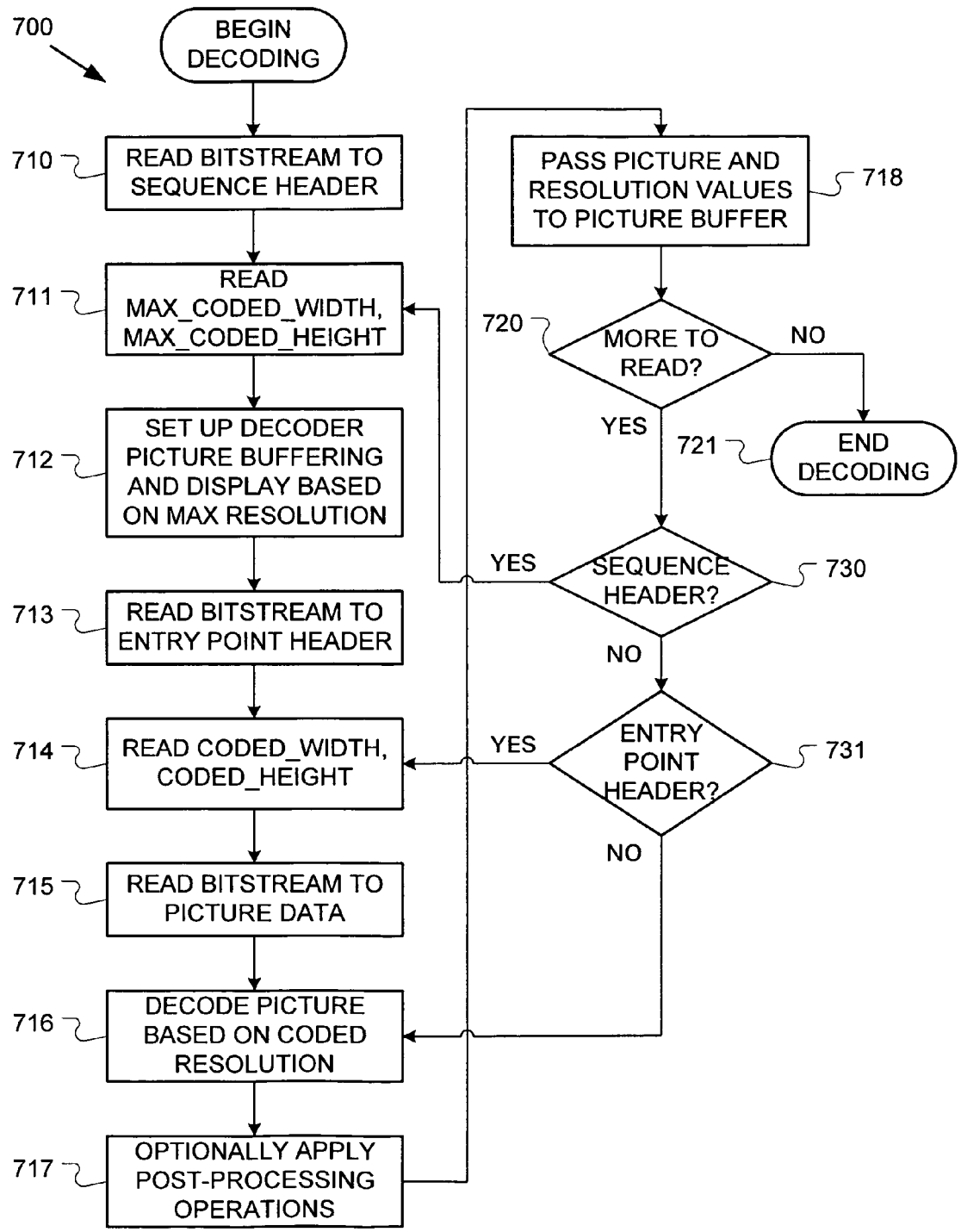
FIG. 7 is a flow diagram of a method utilized in the decoder of FIG. 3 for decoding a video sequence using variable coding resolution.
Figure 8:
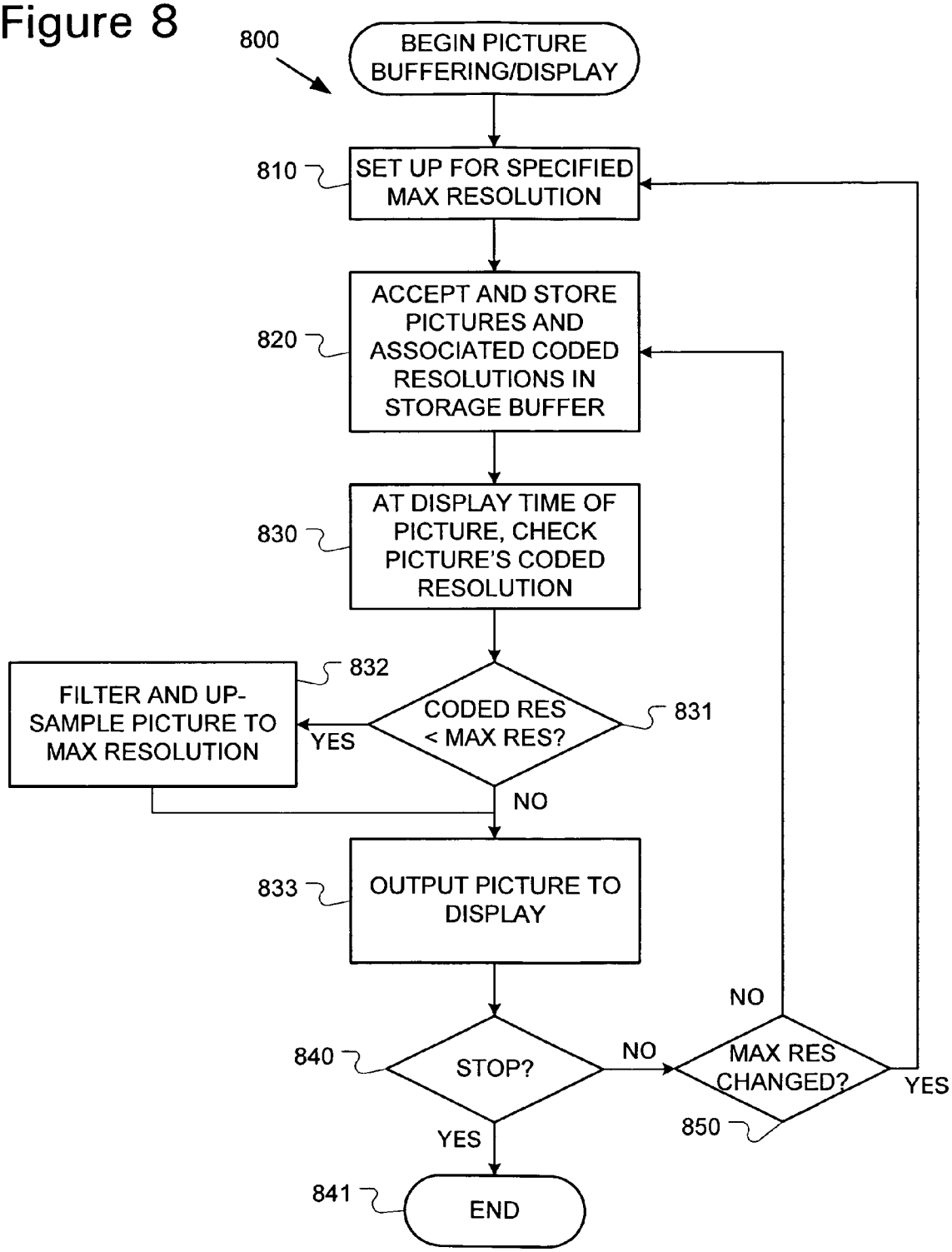
FIG. 8 is a flow diagram of a method utilized in the decoder of FIG. 3 for buffering and displaying the video sequence decoded by the method of FIG. 7.

FIGS. 7 and 8 show operations performed in the compression decoder 156 of the video player 150 (FIG. 1) to decode and display the compressed video sequence using variable coded resolution. The illustrated decoding process 700 and picture buffering and display process 800 is simplified to show those operations directly involved in the variable coded resolution technique. However, it should be understood to those skilled in the art that compression decoding of the video sequence involves many more operations as generally summarized above for the exemplary video decoder 300 (FIG. 3). The buffering and display process can be performed in the compression decoder, or by a separate resampler and display processor. Alternative implementations of the compression decoder can perform the variable coded resolution using fewer, more or a different arrangement of operations.

The compression decoder begins a decoding process 700 by reading the compressed video bit stream and finds the location of the sequence header (operation 710). The compression decoder then reads the maximum coded resolution from the MAX_CODED_WIDTH and MAX_CODED_HEIGHT syntax elements in the sequence header at operation 711. The compression decoder then sets up a picture buffering and display process 800 appropriately for the specified maximum coded resolution at operation 712.

The compression decoder then continues reading the bit stream up to an entry point header at operation 713. The compression decoder reads the coded resolution specified by the CODED_SIZE flag, CODED_WIDTH element and CODED_HEIGHT element at operation 714.

The compression decoder continues reading the bit stream and finds the location of a video picture at operation 715. At operation 716, the compression decoder proceeds to decode the picture based on the current coded resolution. For pictures that are B- or P-frames, the compression decoder uses the previously decoded picture(s) in the picture buffer.

At operation 717, the compression decoder can advantageously apply post-processing operations to the decoded picture at its coded resolution before the picture buffering and display process 800 re-samples the picture up to the display resolution. The post-processing operations can include de-blocking, de-ringing or other artifact removal, range remapping and/or color conversion, and other like processes, which may be performed in any arbitrary order. Other implementations may include more or fewer of these post-processing operations. These operations are further detailed below. In the illustrated compression decoder, the post-processing operations are optional, and applied to the picture when signaled by the encoder (via the POSTPROCFLAG element 430). In other implementations of the compression decoder, some or all of the post-processing operations may always be applied. In alternative implementations, the compression decoder can apply these post-processing operations to the pictures at their respective coded resolutions as a separately running process between the decoding process 700 and the buffering and display process 800, rather than as each picture is decoded.

At operation 718, the compression decoder passes the decoded picture, along with values specifying its coded resolution to the decoded picture buffer where the decoded picture is stored for possible re-ordering and delay until the arrival of the display time for that picture.

The compression decoder then continues reading the bit stream, checking at operation 720 whether there are more pictures encoded in the bit stream. If there is no additional picture data, the compression decoder ends the decoding process 700 at operation 721. Otherwise, the compression decoder determines what information is next encoded in the bit stream. In the case of a further sequence header (operation 730), the compression decoder returns to reading the maximum coded resolution at operation 711. In the case of an entry point header (operation 731), the compression decoder returns to operation 714, reading the new coded resolution. Otherwise, the information is further picture data and the compression decoder decodes the picture based on the current coded resolution.

In the picture buffering and display process 800, the compression decoder sets up buffering for the specified maximum coded resolution at operation 810. At operation 820, the compression decoder accepts and stores pictures and their associated coded resolutions in the decoded picture buffer. Later, at display time of a picture, the compression decoder checks the picture's coded resolution at operation 830. If the picture's coded resolution is less than the maximum coded resolution at operation 831, the compression decoder filters and up-samples the picture to the maximum coded resolution 832. Likewise, the compression decoder can additionally perform range expansion (i.e., range re-mapping to an expanded display range) if the coded range of the picture is lower than the display range at operations 830-831. The decoding of video at a lower range than that of display can be done as described in Lin et al., "FLEXIBLE RANGE REDUCTION," U.S. patent application Ser. No. 10/989,702, filed Nov. 15, 2004; and Lin et al., "RANGE REDUCTION," U.S. Pat. No. 7,502,415, both of whose disclosures are hereby incorporated herein by reference.

The compression decoder outputs the picture to the display at operation 833.

Finally, the compression decoder checks (operation 840) whether the display operation is continuing (e.g., based on user input or end of the video sequence). If so, the compression decoder ceases operation at operation 841. Otherwise, the decoder checks at operation 850 whether the maximum coded resolution is changed. If so, the decoder re-sets the picture buffering for the new maximum coded resolution at operation 810. Otherwise, the decoder returns to storing decoded pictures in the picture buffer.

5. Post-Processing Operations

In the variable resolution coding of the exemplary video codec detailed herein, the video decoder 300 (FIG. 3) optionally applies one or more post processing operations, which can include de-blocking, de-ringing or other artifact removal, range remapping, color conversion and other like processes. For pictures having coded resolutions lower than the display resolution, these post-processing operations are applied prior to range expansion and re-sampling to the display resolution, as described above. The exemplary video codec includes de-blocking and de-ringing filters as optional post-processing operations. Alternative implementations of the video codec can include additional or fewer post-processing operations applied by the video decoder at the native resolution of the decoded picture (i.e., at the picture's coded resolution), such as other filtering for artifact removal, range remapping, color conversion, and etc.

It has been found that the application of post-processing (e.g., de-blocking and/or de-ringing) to images with relatively large frame sizes compressed at high bit rates can have significantly less perceptual benefit (or even cause perceptual degradation) as compared to similar post-processing applied to smaller or more highly compressed images. Similarly, the perceptual need for post-processing varies with image content (for example, artifacts may be more objectionable in a finely-detailed low-motion sequence than in an explosion). As such, it is highly beneficial to provide author-generated metadata regarding the level of post-processing to be applied to a segment.

In the exemplary video codec implementation, the post-processing includes optionally applying two post-processing filters, a de-blocking filter and a de-ringing filter described in the following sections 5.1 and 5.2, which are variations of de-blocking and de-ringing filters defined in the MPEG4, ISO/IEC 14496 standard. The application of either one or both of them may be signaled in the bitstream with the POST-PROC field of the picture layer, as described above. When so indicated, the post-processing filters described in this section may be applied by the decoder after decoding the frame but before display as described in the preceding section.

5.1 De-Blocking Filter

The video decoder applies de-blocking filter operations along the 8×8 block edges in the picture as shown in FIG. 11 as a post-processing operation. Luma as well as chrominance data is filtered.

In the filter operations, two modes (an "offset" mode and a "default" mode) are used separately depending on the pixel conditions around a boundary. The procedure in the following pseudo-code listing is used to find a very smooth region with blocking artifacts due to small dc offset and to assign it a DC offset mode. In the other case, default mode operations are applied.

--- eq_cnt = $\phi(v0-v1) + \phi(v1-v2) + \phi(v2-v3) + \phi(v3-v4) + \phi(v4-v5) + \phi(v5-v6) + \phi(v6-v7)$
$+ \phi(v7-v8) + \phi(v8-v9)$,
where $\phi(\gamma) = 1$ if $|\gamma| \leq$ THR1 and 0 otherwise.
If (eq_cnt $\geq$ THR2)
   DC offset mode is applied,
else
   Default mode is applied.

---

In the default mode, a signal adaptive smoothing scheme is applied by differentiating image details at the block discontinuities using the frequency information of neighbor pixel arrays, $S_0$, $S_1$, and $S_2$. The filtering scheme in default mode is executed by replacing the boundary pixel values $v_4$ and $v_5$ with $v_4'$ and $v_5'$ as follows:

$$v_4' = v_4 - d,$$

$$v_5' = v_5 + d,$$

and $$d = \text{CLIP}(5 \cdot (a_{3,0}' - a_{3,0})//8, 0, (v_4 - v_5)/2) \cdot \delta(|a_{3,0}| < QP)$$

where $$a_{3,0}' = \text{SIGN}(a_{3,0}) \cdot \text{MIN}(|a_{3,0}|, |a_{3,1}|, |a_{3,2}|).$$

Frequency components $a_{3,0}$, $a_{3,1}$, and $a_{3,2}$ can be evaluated from the simple inner product of the approximated DCT kernel $[2\ -5\ 5\ -2]$ with the pixel vectors, i.e., $$a3,0 = ([2\ -5\ 5\ -2] \cdot [v3\,v4\,v5\,v6]T)//8,$$

$$a3,1 = ([2\ -5\ 5\ -2] \cdot [v1\,v2\,v3\,v4]T)//8,$$

$$a3,2 = ([2\ -5\ 5\ -2] \cdot [v5\,v6\,v7\,v8]T)//8.$$

Here CLIP(x,p,q) clips x to a value between p and q; and QP denotes the quantisation parameter of the macroblock where pixel $v_5$ belongs. The expression $\delta(\text{condition}) = 1$ if the "condition" is true and 0 otherwise.

In a very smooth region, the filtering in the default mode is not good enough to reduce the blocking artifact due to dc offset. So, the de-blocking operation treats this case in the DC offset mode and applies a stronger smoothing filter as illustrated in the following pseudo-code listing:

```
max = MAX (v1, v2, v3, v4, v5, v6, v7, v8),
      min = MIN (v1, v2, v3, v4, v5, v6, v7, v8),
if ( |max - min| < 2 · QP ) {
```

$$v'_n = \sum_{k=-4}^{4} b_k \cdot p_{n+k}, \ 1 \leq n \leq 8$$

$$p_m = \begin{cases} (|v_1 - v_0| < QP)?v_0 : v_1, & \text{if } m < 1 \\ v_m, & \text{if } 1 \leq m \leq 8 \\ (|v_8 - v_9| < QP)?v_9 : v_8, & \text{if } m > 8 \end{cases}$$

$$\{b_k :-4 \leq k \leq 4\} = \{1,1,2,2,4,2,2,1,1\}//16$$

```
}
else
    No change will be done.
```

The above filter operations are applied for all the block boundaries first along the horizontal edges followed by the vertical edges. If a pixel value is changed by the previous filtering operation, the updated pixel value is used for the next filtering.

5.2 De-Ringing Filter

This filter comprises three subprocesses; threshold determination, index acquisition and adaptive smoothing. This filter is applied to the pixels on 8×8 block basis. More specifically 8×8 pixels are processed by referencing 10×10 pixels at each block. The following notation is used to specify the six blocks in a macroblock. For instance, block[5] corresponds to the Cb block whereas block[k] is used as a general representation in the following sub clauses.

Threshold determination. Firstly, calculate maximum and minimum gray value within a block in the decoded image. Secondarily, the threshold denoted by thr[k] and the dynamic range of gray scale denoted by range[k] are set:

thr[k]=(maximum[k]+minimum[k]+1)/2 range[k]=maximum[k]−minimum[k]

An additional process is done only for the luma blocks. Let max_range be the maximum value of the dynamic range among four luma blocks.

max_range=range[$k_{max}$]

Then apply the rearrangement as follows.

```
for( k=1 ; k<5 ; k++ ){
    if( range[k] < 32 && max_range >=64 )
        thr[k] = thr[kmax];
    if( max_range<16 )
        thr[k] = 0;
}
```

Index acquisition. Once the threshold value is determined, the remaining operations are purely 8×8 block basis. Let rec(h,v) and bin(h,v) be the gray value at coordinates (h,v) where h,v=0, 1, . . . , 7, and the corresponding binary index, respectively. Then bin(h,v) can be obtained by:

$$bin(h, v) = \begin{cases} 1 & \text{if } rec(h, v) \geq thr \\ 0 & \text{otherwise} \end{cases}$$

Note that (h,v) is use to address a pixel in a block, while (i,j) is for accessing a pixel in a 3×3 window.

Adaptive Smoothing.

Adaptive filtering. FIG. 11 shows the binary indices in 8×8 block level that are used in adaptive filtering, whereas practically 10×10 binary indices are calculated to process one 8×8 block. The filter is applied only if the binary indices in a 3×3 window are all the same, i.e., all "0" indices or all "1" indices. Note 10×10 binary indices are obtained with a single threshold which corresponds to the 8×8 block shown in FIG. 11, where the shaded region represents the pixels to be filtered.

The filter coefficients used for both intra and non-intra blocks denoted by coef(i,j), where i,j=−1,0,1, are given by the filter mask shown in the FIG. 12. Here the coefficient at the center pixel, i.e., coef(0,0), corresponds to the pixel to be filtered. The filter output flt'(i,j) is obtained by:

$$flt'(h, v) = \left\{ 8 + \sum_{i=-1}^{1} \sum_{j=-1}^{1} coef(i, j) \cdot rec(h+1, v+j) \right\} //16$$

Clipping. The maximum gray level change between the reconstructed pixel and the filtered one is limited according to the quantisation parameter, i.e., QP. Let flt(h,v) and flt'(h,v) be the filtered pixel value and the pixel value before limitation, respectively. The clipping is applied as per the following pseudo-code listing:

```
if( flt'(h,v) − rec(h,v) > max_diff )
    flt(h,v) = rec(h,v) + max_diff
else if( flt'(h,v) − rec(h,v) < −max_diff )
    flt(h,v) = rec(h,v) − max_diff
else
    flt(h,v) = flt'(h,v)
where max_diff=QP/2 for both intra and inter macroblocks
```

5.3 Other Post-Processing Operations

Alternative implementations of the video codec can apply additional or different post-processing operations at the coded resolution of picture frames in a video sequence having variable resolution coding, such as other artifact removal operations, range remapping, color conversion and like processing. The operations can be applied on an optional basis, as signaled from the encoder in the video bit-stream (such as using one or more flags in the bit-stream syntax, in manners similar to the POSTPROC syntax element described above). Alternatively, some post-processing operations can always be applied by the video decoder. The video decoder can apply the post-processing operations in any arbitrary or desired order.

In one example, the video decoder optionally applies the range remapping operation of the type described in Lin et al., "FLEXIBLE RANGE REDUCTION," U.S. patent application Ser. No. 10/989,702, filed Nov. 15, 2004; and Lin et al., "RANGE REDUCTION," U.S. Pat. No. 7,502,415, both of whose disclosures are hereby incorporated herein by reference.

In other examples, the video decoder optionally applies the de-ringing and/or de-blocking operations as described in Srinivasan et al., "BITSTREAM-CONTROLLED POST-PROCESSING FILTERING," U.S. patent application Ser. No. 10/680,072, filed Oct. 6, 2003; Srinivasan et al., "IN-LOOP DE-BLOCKING FILTER," U.S. patent application Ser. No. 10/623,128, filed Jul. 18, 2003; and Lin, "IN-LOOP DE-BLOCKING FOR INTERLACED VIDEO," U.S. patent application Ser. No. 10/934,116, filed Sep. 4, 2004, all of whose disclosures are hereby incorporated herein by reference.

6. Computing Environment

The above described implementations of the variable coding resolution techniques can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 9.

Figure 9:
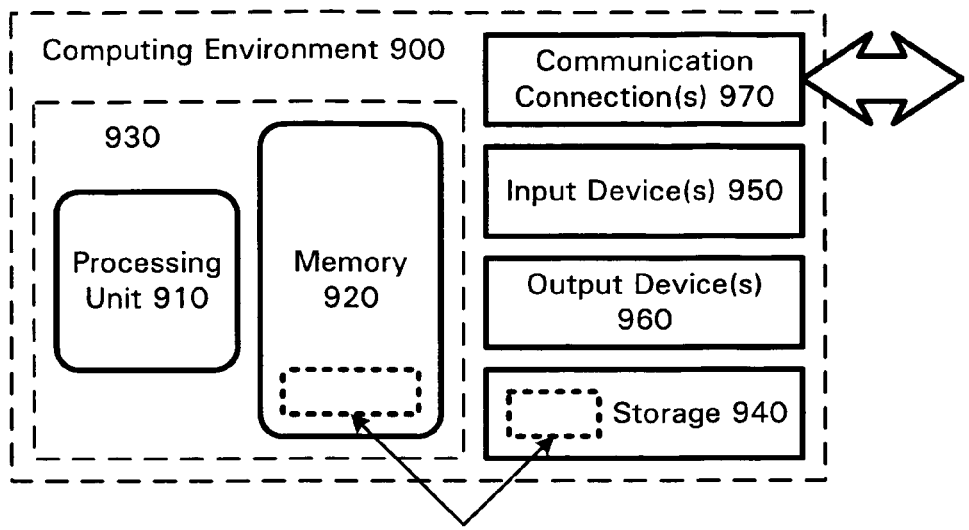
FIG. 9 is a block diagram of a suitable computing environment for the video encoder/decoder of FIGS. 2 and 3.
Figure 10:
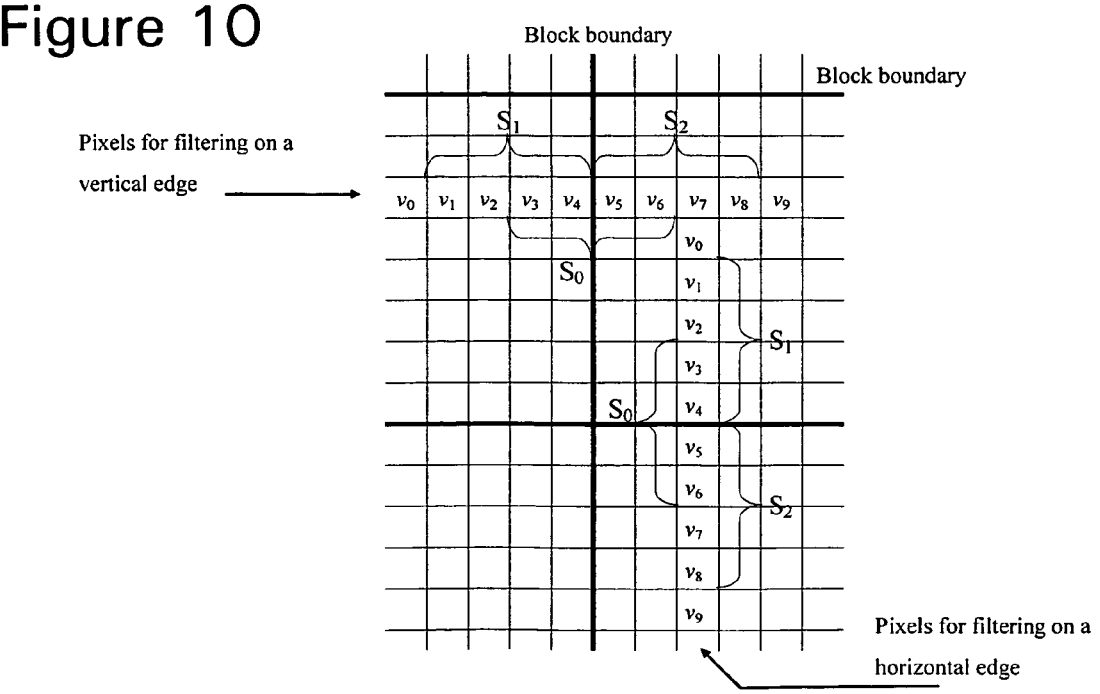
FIG. 10 is a diagram illustrating application of a de-blocking filter at block boundaries in a picture by the video decoder of FIG. 3.

FIG. 9 illustrates a generalized example of a suitable computing environment (900) in which the described variable coding resolution techniques may be implemented. The computing environment (900) is not intended to suggest any limitation as to scope of use or functionality of the invention, as the present invention may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing the described variable coding resolution techniques.

A computing environment may have additional features. For example, the computing environment (900) includes storage (940), one or more input devices (950), one or more output devices (960), and one or more communication connections (970). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, CD-RWs, DVDs, or any other medium which can be used to store information and which can be accessed within the computing environment (900). The storage (940) stores instructions for the software (980) implementing the video codec that performs the variable coding resolution techniques.

The input device(s) (950) may be a touch input device such as a keyboard, mouse, pen, or trackball, a voice input device, a scanning device, or another device that provides input to the computing environment (900). For video, the input device(s) (950) may be a video card or similar device that accepts video input in analog or digital form, or a CD or DVD-ROM reader that provides recorded video to the computing environment. The output device(s) (960) may be a display, printer, speaker, CD-writer, or another device that provides output from the computing environment (900).

The communication connection(s) (970) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The variable coding resolution techniques herein can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The variable coding resolution technique herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of decoding video using a computing device that implements a video decoder, comprising:

with the computing device that implements the video decoder, parsing plural syntax elements from a sequence header for a video bit stream, where the sequence header is integral to the video bit stream, the video bit stream having a plurality of entry point segments of a video sequence, at least one of said entry point segments comprising coded content of a group of pictures separate from that of another of said entry point segments of the video sequence, and wherein the plural syntax elements parsed from the sequence header include plural coded resolution syntax elements that indicate a maximum coded width and a maximum coded height for the video sequence;

with the computing device that implements that video decoder, decoding one of the entry point segments of the video sequence, wherein values of the pictures in the entry point segment have a first range, and wherein the decoding includes:

for the entry point segment, determining whether to use the maximum coded width and the maximum coded height for the video sequence as coded width and coded height, respectively, for the pictures of the entry point segment, and, if not, determining the coded width and the coded height for the pictures of the entry point segment from plural coded resolution syntax elements of an entry point header for the entry point segment; and decoding the pictures of the entry point segment;

with the computing device that implements that video decoder, applying one or more post-processing operations to the respective pictures of the decoded entry point segment, including performing range remapping to remap the values of the respective pictures from the first range to a second range, wherein the one or more post-processing operations further comprise a color conversion operation; and with the computing device that implements that video decoder, reconstructing at least part of the video sequence with the decoded entry point segment.

2. The method of claim 1 further comprising:

applying said one or more post-processing operations to the respective pictures of the decoded entry point segment at a native resolution of the decoded entry point segment; and up-sampling the respective pictures of the decoded entry point segment to the maximum coded width and maximum coded height for display of the video.

3. The method of claim 1 further comprising:

for the respective pictures of the entry point segment, decoding a post-processing operation-signaling syntax element signaling whether one or more additional post-processing operations are to be applied to the respective pictures of the decoded entry point segment; and applying the additional post-processing operations as signaled by the post-processing operation-signaling syntax element.

4. The method of claim 3 wherein the post-processing operation-signaling syntax element is encoded at least in part at a frame level of the video bit stream.

5. The method of claim 3 wherein the post-processing operation-signaling syntax element signals to apply de-blocking and de-ringing.

6. The method of claim 3 wherein the post-processing operation-signaling syntax element signals to optionally apply de-blocking, de-ringing, or a combination of de-blocking and de-ringing.

7. The method of claim 6 comprising in the case that the post-processing operation-signaling syntax element signals to apply de-blocking and de-ringing in combination, applying de-blocking before de-ringing.

8. The method of claim 1 wherein the one or more post-processing operations further comprise one or more de-blocking filter stages.

9. The method of claim 1 wherein the one or more post-processing operations further comprise one or more de-ringing filter stages.

10. The method of claim 1 wherein the one or more post-processing operations further comprise an artifact removal operation.

11. The method of claim 1 wherein the plural coded resolution syntax elements of the sequence header include a first sequence-layer syntax element indicating the maximum coded width for the video sequence and a second sequence-layer syntax element indicating the maximum coded height for the video sequence, and wherein the entry point header includes:

a first entry point-layer syntax element indicating if the video bitstream includes syntax elements for the coded width and the coded height for the pictures of the entry point segment; and if so, a second entry point-layer syntax element indicating the coded width for the pictures of the entry point segment and a third entry point-layer syntax element indicating the coded height for the pictures of the entry point segment.

12. A video decoder, comprising:

means for reading elements specifying a maximum coded resolution for a video sequence from a sequence header of the video sequence in a compressed video bit stream, the video sequence having a plurality of entry point segments for separate sub-sequences of pictures of the video sequence, each of the entry point segments being marked by a separate entry point and having coded content of a group of at least one picture, at least two of the entry point segments having coded content of separate groups of at least one picture;

means for reading a flag indicative of whether all of one of the entry point segments in the video sequence is encoded at a lower coded resolution, the flag being signaled in an entry point header for the entry point segment;

means for reading elements specifying the lower coded resolution from the entry point header for the entry point segment when indicated for the entry point segment by the flag;

means for decoding the at least one picture of the entry point segment;

means for reading elements in the compressed video bit stream specifying whether post-processing is to be performed for the at least one picture of the entry point segment, wherein the elements specifying whether post-processing is to be performed comprise bits encoding whether to perform de blocking, de ringing, de blocking and de-ringing, or neither;

means for optionally applying a post-processing operation to the at least one decoded picture while at the lower coded resolution, wherein the means for optionally applying the post-processing operation applies the post-processing operation in accordance with the elements specifying whether post-processing is to be performed; and means for up-sampling the at least one picture of the entry point segment from the lower coded resolution to the maximum coded resolution of the video sequence after said optionally applying the post-processing operation.

13. The video decoder of claim 12 wherein the post-processing operation further comprises any one or more of range remapping and color conversion.

14. A method of decoding video using a computing device that implements a video decoder, comprising:

with the computing device that implements the video decoder, parsing plural syntax elements from a sequence header for a video bit stream, where the sequence header is integral to the video bit stream, the video bit stream having a plurality of entry point segments of a video sequence, at least one of said entry point segments comprising coded content of a group of pictures separate from that of another of said entry point segments of the video sequence, and wherein the plural syntax elements parsed from the sequence header include plural coded resolution syntax elements that indicate a maximum coded width and a maximum coded height for the video sequence;

with the computing device that implements that video decoder, decoding one of the entry point segments of the video sequence, wherein values of the pictures in the entry point segment have a first range, and wherein the decoding includes:

for the entry point segment, determining whether to use the maximum coded width and the maximum coded height for the video sequence as coded width and coded height, respectively, for the pictures of the entry point segment, and, if not, determining the coded width and the coded height for the pictures of the entry point segment from plural coded resolution syntax elements of an entry point header for the entry point segment; and decoding the pictures of the entry point segment, including for each of the pictures of the entry point segment, decoding a post-processing operation-signaling syntax element signaling whether one or more post-processing operations are to be applied to the respective pictures of the decoded entry point segment, wherein the post-processing operation-signaling syntax element signals to optionally apply de-blocking, de-ringing, or a combination of de-blocking and de-ringing; and with the computing device that implements that video decoder, applying one or more post-processing operations to the respective pictures of the decoded entry point segment, including performing range remapping to remap the values of the respective pictures from the first range to a second range, and further including for each of the respective pictures, applying the post-processing operations as signaled by the post-processing operation-signaling syntax element for that picture; and with the computing device that implements that video decoder, reconstructing at least part of the video sequence with the decoded entry point segment.

15. The method of claim 14 further comprising:
applying said one or more post-processing operations to the respective pictures of the decoded entry point segment at a native resolution of the decoded entry point segment; and
up-sampling the respective pictures of the decoded entry point segment to the maximum coded width and maximum coded height for display of the video.

16. The method of claim 14 wherein the post-processing operation-signaling syntax element is encoded at least in part at a frame level of the video bit stream.

17. The method of claim 14 comprising in the case that the post-processing operation-signaling syntax element signals to apply de-blocking and de-ringing in combination, applying de-blocking before de-ringing.

18. A method of decoding video using a computing device that implements a video decoder, comprising:

with the computing device that implements the video decoder, parsing plural syntax elements from a sequence header for a video bit stream, where the sequence header is integral to the video bit stream, the video bit stream having a plurality of entry point segments of a video sequence, at least one of said entry point segments comprising coded content of a group of pictures separate from that of another of said entry point segments of the video sequence, and wherein the plural syntax elements parsed from the sequence header include plural coded resolution syntax elements that indicate a maximum coded width and a maximum coded height for the video sequence;

with the computing device that implements that video decoder, decoding one of the entry point segments of the video sequence, wherein values of the pictures in the entry point segment have a first range, and wherein the decoding includes:

for the entry point segment, determining whether to use the maximum coded width and the maximum coded height for the video sequence as coded width and coded height, respectively, for the pictures of the entry point segment, and, if not, determining the coded width and the coded height for the pictures of the entry point segment from plural coded resolution syntax elements of an entry point header for the entry point segment; and decoding the pictures of the entry point segment;

with the computing device that implements that video decoder, applying one or more post-processing operations to the respective pictures of the decoded entry point segment, including performing range remapping to remap the values of the respective pictures from the first range to a second range, wherein the one or more post-processing operations further comprise one or more de-ringing filter stages; and with the computing device that implements that video decoder, reconstructing at least part of the video sequence with the decoded entry point segment.

19. The method of claim 18 further comprising:
applying said one or more post-processing operations to the respective pictures of the decoded entry point segment at a native resolution of the decoded entry point segment; and
up-sampling the respective pictures of the decoded entry point segment to the maximum coded width and maximum coded height for display of the video.

20. The method of claim 18 wherein the one or more post-processing operations further comprise one or more de-blocking filter stages.

* * * * *